May 8, 1951 — T. J. GILL, JR — 2,552,006
INTERNAL-COMBUSTION ENGINE
Filed Oct. 26, 1948

INVENTOR.
THOMAS J. GILL, JR.
BY
McMorrow, Berman & Davidson
ATTORNEYS.

Patented May 8, 1951

2,552,006

UNITED STATES PATENT OFFICE 2,552,006

INTERNAL-COMBUSTION ENGINE

Thomas J. Gill, Jr., Laurinburg, N. C.

Application October 26, 1948, Serial No. 56,498

4 Claims. (Cl. 123—65)

This invention relates to internal combustion engines, and more particularly to an internal combustion engine of the two cycle type.

A main object of the invention is to provide a novel and improved internal combustion engine of the two stroke cycletype having improved means for regulating the time in the engine cycle at which the exhaust valves for the engine cylinders open and close, whereby the engine can be operated with high thermal efficiency at full load and with high mechanical efficiency at light loads and low speeds.

A further object of the invention is to provide an improved internal combustion engine which may be designed to provide a smaller weight to horsepower ratio than engines of the same type previously designed, which functions with high fuel economy, which has high torque characteristics at all speeds, which has good speed regulation over a wide range of loads and speeds, which is easy to start, and which is rugged in construction.

Further objects and advantages of the invention will become apparent from the following description and claims, and from the accompanying drawings, wherein:

Figure 1:
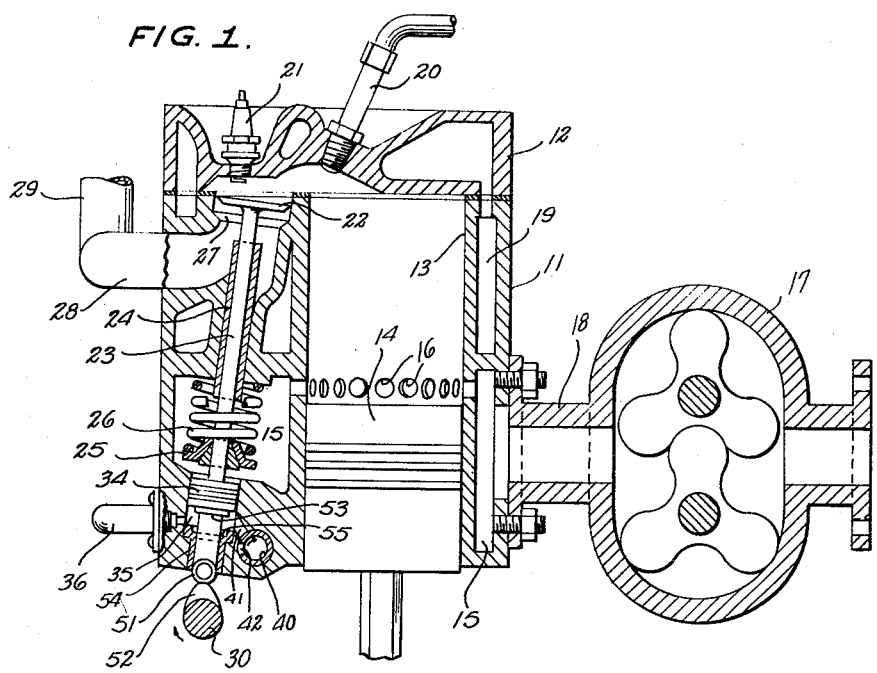
Figure 1 is a cross-sectional view taken transversely through an internal combustion engine constructed in accordance with the present invention.
Figure 2:
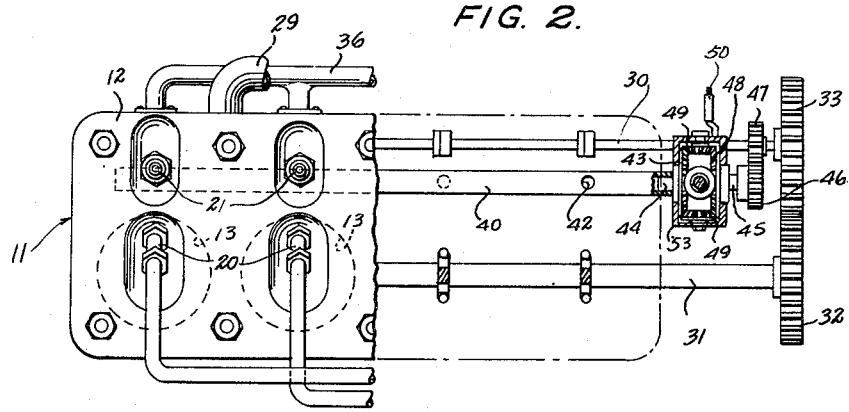
Figure 2 is a fragmentary top plan view of the internal combustion engine of Figure 1, the air blower being omitted.

Referring to the drawings, 11 designates the engine block and 12 designates the cylinder head of the engine. The engine is shown as having four cylinders, but may be provided with any other desired number of cylinders within the spirit of the present invention. The cylinders are shown at 13, and slidably positioned in each cylinder is a piston 14, the pistons being connected to the engine crankshaft 31 in a conventional manner.

The lower portion of the engine block is formed with an air space 15 surrounding the respective cylinders, the cylinder walls being formed at 16 with apertures connecting the intermediate portions of the cylinders with said air space. Designated at 17 is an air blower, driven in a conventional manner from the engine crankshaft and connected by a conduit 18 to air space 15. The engine block is also formed with a water cooling space 19 through which water is circulated in the usual manner to cool the engine.

Adjacent the top end of each cylinder, the cylinder head 12 carries a fuel injection nozzle 20, connected to a suitable fuel injection device of conventional design coupled to the engine crankshaft and arranged so as to inject a charge of fuel, such as gasoline into each cylinder when the piston 14 thereof approaches the top end of its stroke. The head 12 also carries spark plugs 21 which are connected to a suitable distributor, also mechanically coupled to the crankshaft, and which provides a spark in the space adjacent each cylinder 13 when the piston thereof reaches the top end of its stroke.

Each cylinder is provided with an exhaust valve 22 having a valve stem 23 which reciprocates in a sleeve bushing 24 secured in block 11. The lower portion of stem 23 has secured thereto a washer 25, and encircling stem 23 is a coiled spring 26 bearing between washer 25 and the upper wall of space 15, thereby biasing the valve 22 toward its seat, shown at 27. Communicating with the space below each seat 27 is an exhaust conduit 28 leading to the exhaust manifold, shown at 29.

Figure 3:
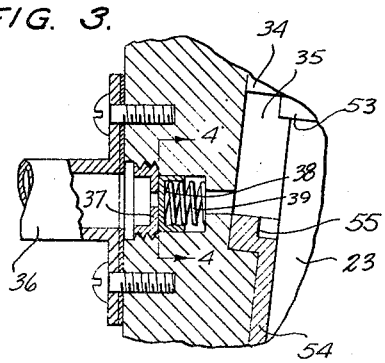
Figure 3 is an enlarged cross-sectional detail view taken vertically through the oil intake valve leading to an exhaust valve control cylinder of the engine of Figures 1 and 2.
Figure 4:
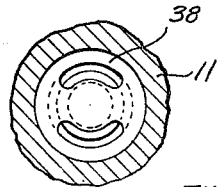
Figure 4 is an enlarged cross-sectional detail view taken on line 4—4 of Figure 3.

Designated at 30 is a camshaft driven from the engine crankshaft, indicated at 31, through the gears 32 and 33. Each stem 23 carries a piston or plunger 34 below washer 25, which reciprocates in a control cylinder 35 formed in block 11. Connected to the space in each cylinder 35 below the piston 34 therein is an oil injection conduit 36 leading to a source of oil under pressure, as, for example, an oil pump. As shown in Figure 3, a check valve is provided in the connection between conduit 36 and each cylinder 35, said check valve comprising, for example, the centrally apertured hollow plug 37 secured to the block 11 in the passage between said conduit and said control cylinder, and the arcuately slotted cup member 38 held against plug 37 by a spring 39, whereby the central aperture in plug 37 is normally closed off but is opened when the fluid pressure in conduit 36 is allowed to overcome the force of spring 39 and the back pressure in control cylinder 35, as will be subsequently described.

Rotatably mounted in the lower portion of block 11 adjacent the respective control cylinder 35 is a hollow sleeve member 40. Connecting each control cylinder 35 and the cylindrical seat containing sleeve member 40 is a passage 41.

The sleeve member 40 is formed with respective apertures 42 adapted to register with said passages 41. At its outer end sleeve member 40 carries a bevel gear 43 and is formed adjacent said bevel gear with an aperture 44 allowing the interior of the sleeve member to drain into the engine oil sump. Journalled in suitable bearings, not shown, is a shaft 45 axially aligned with sleeve member 40 and carrying a gear 46 which meshes with an identical gear 47 carried on camshaft 30. Shaft 45 also carries a bevel gear 48 opposing bevel gear 43 and coupled to said opposing bevel gear by pinion bevel gears 49 rotatably supported in a housing 53, which encloses the bevel gears. Said housing is provided with a handle 50 whereby the housing may be manually rotated to advance or retard the position of sleeve member 40 with respect to camshaft 30.

Referring now to Figure 1, camshaft 30 rotates clockwise at crankshaft speed. Rotary valve 40 also rotates clockwise at crankshaft speed. Starting with the piston 14 in its lowermost position, shown in Figure 1, it will be seen that the cam follower, shown at 51, is elevated to its uppermost position by the lobe of the cam 52 on camshaft 30 associated with cylinder 13. The exhaust valve 22 is thus open. The air intake holes 16 are also open and air is forced into the cylinder by blower 17, the air flowing up through the cylinder and blowing the exhaust gases out of the cylinder past the open exhaust valve 22 into exhaust manifold 29. As the piston 14 rises it closes off openings 16, terminating the intake of air into the cylinder. Oil has previously been drawn into the space 35 by the upward movement of piston or plunger 34. This oil is trapped in space 35, holding the exhaust valve 22 open, until the opening 42 in sleeve member 40 comes into registry with passage 41. Therefore, exhaust valve 22 will be held open beyond the time that cam follower 51 is disengaged from the lobe of the cam 52 if opening 42 lags in phase behind said cam lobe. Compression starts as soon as exhaust valve 22 closes. Fuel injection from nozzle 20 occurs as piston 14 approaches the top of its stroke, and ignition occurs shortly thereafter. On the power stroke, piston 14 descends, and as said piston approaches the lower end of its stroke, cam 52 opens valve 22, allowing the exhaust gases to escape. At this point oil is admitted into space 35 by the relief of back pressure therein and the suction produced by the upward movement of piston or plunger 34. As piston 14 reaches the lower end of its stroke, air intake ports 16 are uncovered and the entire cylinder will be scavenged by fresh air from blower 17. The cycle will then be repeated.

It will be noted from Figures 1 and 3 that piston 34 is provided at its bottom end with an annular shoulder portion 53. The cam follower guide bushing, shown at 54 is formed with an annular recess 55 into which the shoulder portion 53 is receivable as valve 22 closes. Shoulder portion 53 cooperates with recess 55 to insure the silent closing of valve 22 as well as to prevent the valve from closing so suddenly as to damage the valve and its seat. When the valve is completely closed the shoulder portion 53 will be most of the way down into the recess 55 provided for it in bushing 54. The shoulder portion 53, upon entering the recess in the bushing, will have to displace a volume of oil from the recess in the bushing equal to the displacement of whatever portion of the shoulder that has entered the recess, forcing this volume of oil through the clearance between the side of the shoulder and the side walls of the recess in the bushing. This clearance is such as to provide an opening substantially equal in area to the difference between the area of the bottom of the shoulder and the area of the bottom of the recess. The greater this difference is the less retarding or damping effect it will impart to the valve. This opening is preferably made just small enough to prevent the valve from pounding or clicking when it closes, and no smaller.

By adjusting the throttle handle 50 so as to retard the movement of opening 42 into registry with passage 41, the exhaust valve 22 may be made to close late, as may be desired in the case of no load idling conditions. By advancing the time at which opening 42 registers with passage 41 the exhaust valve 22 may be made to close earlier. At the position of maximum advance, as under full load conditions, the cam follower 51 will follow the contour of cam 52 and exhaust valve 22 will close early in the upward stroke of piston 14.

It is thus seen that by advancing or retarding the sleeve valve 40, and by a corresponding regulation of the fuel injection system, the engine can be operated with good speed regulation throughout a wide range of speeds and loads.

While a specific embodiment of a means for regulating the time of closure of the exhaust valves of a two stroke internal combustion engine has been disclosed in the foregoing description, it will be understood that various modifications within the spirit of the invention may occur to those skilled in the art. Therefore it is intended that no limitations be placed on the invention except as defined by the scope of the appended claims.

What is claimed is:

1. In an internal combustion engine of the character described, an engine block formed with a cylinder, a piston in said cylinder, fuel injection means in the head portion of the cylinder, ignition means in said head portion, air intake means in the intermediate portion of the cylinder, a crankshaft connected to said piston, an exhaust port in the engine block communicating with the upper portion of said cylinder, a valve rod reciprocably mounted in said block and carrying a valve disc engageable over said exhaust port, spring means biasing the valve disc toward said exhaust port, a camshaft driven by said crankshaft and having a cam element engageable with the end of said valve rod to move said disc from closed to open position, a cylinder formed in said block around said valve rod, a plunger carried by said rod and slidable in said latter cylinder, a rotary exhaust valve for the lower portion of said latter cylinder, and means mechanically coupling said rotary exhaust valve to said camshaft, said coupling means including manually operated means for varying the relative phase angle between the rotary valve and the camshaft.

2. In an internal combustion engine of the character described, an engine block formed with a cylinder, a piston in said cylinder, fuel injection means and fuel ignition means in the head portion of the cylinder, air intake means in the intermediate portion of the cylinder, a crankshaft connected to said piston, an exhaust port in the engine block communicating with the upper portion of said cylinder, a valve rod reciprocably mounted in said block and carrying a valve disc engageable over said exhaust port, spring means biasing the valve disc into seating engagement with said exhaust port, a camshaft driven by said crankshaft and having a cam element engageable with the end of said valve rod to move said disc from closed to open position, a cylinder formed in said block around said valve rod, a plunger carried by said rod and slidable in said latter cylinder, means injecting fluid under pressure into the lower portion of said latter cylinder, a rotary exhaust valve, having an exhaust opening, said block being formed with a passage connecting the lower portion of said latter cylinder with the rotary exhaust valve, said exhaust opening being at time registrable with said passage, a first bevel gear carried by said rotary valve, a shaft coupled to said camshaft and carrying a second bevel gear facing said first bevel gear, a housing surrounding said bevel gears and a pinion gear rotatably carried by said housing and meshing with both bevel gears, whereby rotation of said housing alters the phase relation between said rotary valve and camshaft and varies the time at which the exhaust opening registers with said passage, with respect to the camshaft cycle of rotation.

3. In an internal combustion engine including an engine block having a cylinder provided with an exhaust port, a piston reciprocable within said cylinder, a valve positioned within said block and mounted for movement into and out of closing engagement with said exhaust port, a control cylinder positioned below and in alignment with said valve, a plunger positioned within said control cylinder and connected to said valve, a conduit having one end in communication with said control cylinder and having the other end in communication with a source of fluid pressure, a rotatable hollow sleeve member provided with an aperture positioned within said block adjacent to and spaced from said control cylinder, there being a passageway extending between said control cylinder and said hollow sleeve member, and means for effecting the rotation of said sleeve member to thereby bring the aperture into communication with said passageway and retard the movement of said valve toward its position of closing engagement with said exhaust port.

4. In an internal combustion engine including an engine block having a cylinder provided with an exhaust port, a piston reciprocable within said cylinder, a valve positioned within said block and mounted for movement into and out of closing engagement with said exhaust port, a control cylinder positioned below and in alignment with said valve, a plunger positioned within said control cylinder and connected to said valve, a conduit having one end in communication with said control cylinder and having the other end in communication with a source of fluid pressure, a check valve in said conduit adjacent said one end for preventing return flow through said conduit, a rotatable hollow sleeve member provided with an aperture positioned within said block adjacent to and spaced from said control cylinder, there being a passageway extending between said control cylinder and said hollow sleeve member, and means for effecting the rotation of said sleeve member to thereby bring the aperture into communication with said passageway and retard the movement of said valve toward its position of closing engagement with said exhaust port.

THOMAS J. GILL, Jr.

REFERENCES CITED

The following references are of record in the file of this patent:

UNITED STATES PATENTS

| Number | Name | Date |
|---|---|---|
| 1,100,975 | Harrington | June 23, 1914 |
| 1,149,831 | Hunt | Aug. 10, 1915 |
| 1,188,607 | Barlow | June 27, 1916 |
| 1,196,598 | Shimpf | Aug. 29, 1916 |
| 2,148,854 | Bokemuller | Feb. 28, 1939 |

FOREIGN PATENTS

| Number | Country | Date |
|---|---|---|
| 375,116 | Great Britain | of 1932 |